UNITED STATES PATENT OFFICE.

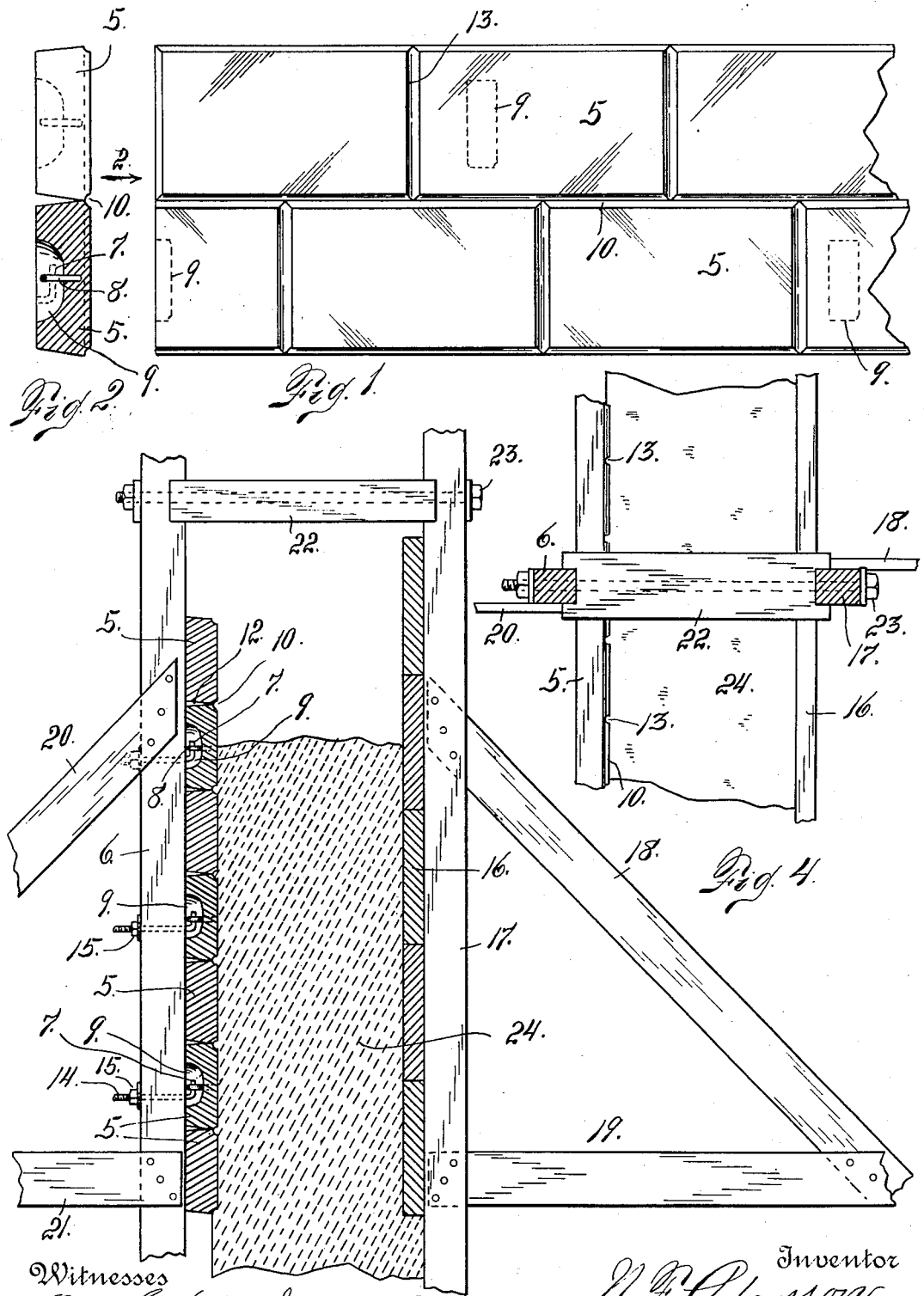

NILS F. ADAMSON, OF DENVER, COLORADO, ASSIGNOR OF ONE-HALF TO THOMAS J. TULLY, OF DENVER, COLORADO.

FACING-MOLD.

969,435.  Specification of Letters Patent.  Patented Sept. 6, 1910.

Application filed November 30, 1908. Serial No. 465,378.

*To all whom it may concern:*

Be it known that I, NILS F. ADAMSON, a citizen of the United States, residing in the city and county of Denver and State of Colorado, have invented certain new and useful Improvements in Facing-Molds; and I do declare the following to be full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in molds for walls of buildings, where these walls are made of cement, concrete, or plastic material of any suitable kind.

The novel feature of the mold relates particularly to the part thereof which engages the facing or outer surface of the wall of the building, and is so constructed as to give the outer surface or face of the wall the appearance of a wall composed of brick or stone blocks of any desired size. The configuration given this surface of the wall, as formed by my improved facing mold, contains beads preferably intersecting each other at suitable angles to represent the outline of brick or stone blocks of the usual size and shape. This facing member of the mold is composed of a series of sections which may consist of boards or planks of the desired width and thickness, which when assembled are placed edgewise one above another, being supported by vertically disposed studs which may be provided with hooks, the latter being engaged by eyes with which the boards or members of the facing mold are provided. The adjacent edges of the members of this portion of the mold are so fashioned that when the members are assembled, longitudinally disposed grooves are formed on its inner surface coincident with the joints formed by the said members. These members are transversely grooved to intersect the longitudinal grooves, the transverse grooves being arranged to give the outer surface or face of the wall the desired configuration, as heretofore expressed. It is essential that grooves shall be formed at all of the joints, whether longitudinal or transverse, resulting from assembling the members of the portion of the mold which engages the outer surface of the wall, since otherwise marks will be formed on the wall coincident with these joints, and these marks are difficult to obliterate. On the contrary, by forming grooves at all the joints, corresponding beads are formed upon the outer face of the wall, after the mold facing has been removed, and if marks appear upon these beads they can be readily obliterated by applying a suitable tool to the beads, since the latter stand out from the wall. In other words, the configuration of the outer surface of the wall is embossed thereon and not impressed therein.

Another feature of my improved facing mold consists in beveling the adjacent edges of the members of the mold so that these edges shall engage each other at their innermost lines of contact, and diverge from each other as they extend outwardly. By virtue of this construction, when the members are assembled, the grooves located at the joints of the members are tightly closed at the bottom, thus preventing the plastic material from working through between these joints.

Having briefly outlined my improved construction, I will proceed to describe the same in detail, reference being made to the accompanying drawing in which is illustrated an embodiment thereof.

In the drawing, Figure 1 is a fragmentary view of a portion of my improved facing mold for concrete walls. Fig. 2 is a view of the same looking in the direction of arrow 2 and shown partly in section. Fig. 3 is a vertical section taken through my improved mold with the plastic material in place. Fig. 4 is a top plan view of the same, two of the studs on opposite sides of the mold being shown in cross section.

The same reference characters indicate the same parts in all the views.

Let the numeral 5 indicate each of a number of boards or planks arranged edgewise one above another, and supported in place by means of vertically disposed studs 6, which are provided with hooks 7 protruding from their inner surfaces, and turned upwardly to receive eyes 8 with which the members 5 are provided. In the outer surface of these members are formed recesses or cavities 9 in which the eyes are located, so that when the members 5 are hung or supported by the hooks, the outer faces of the said members are flush with the inner face or edge of the stud 6. The adjacent inner corners of these members 5 are so fashioned that when the said members are assembled edgewise one above another, longitudinal grooves 10 are formed, the said grooves being coincident with the longtudinal joints formed by the assembling of the members. The adjacent edges of these members extending outwardly from the bottoms of the grooves 10 are beveled in such a manner that these adjacent edges diverge from each other as they extend outwardly, forming V-shaped grooves 12 between the said edges. By virtue of this construction and arrangement, a line of contact between the adjacent edges of the said members is insured at the bottom of each groove 10. The members 5 are also provided with transverse grooves 13 intersecting grooves 10 and so located as to give the facing or outer surface of the wall the appearance of a wall composed of stone blocks or bricks of the desired length. The width of the members 5 of course determines one dimension of the brick-or-stone-wall configuration.

As shown in the drawing, the hooks 7 are formed upon the inner extremities of bolts 14 passed through the stud 6 and held in place by nuts 15 applied to their outer threaded extremities.

The opposite or inner portion of the mold is composed of plain boards or members 16 arranged edgewise one above another and suitably supported upon studs 17, the said studs being held in place by braces 18 and 19. The studs 6 are also supported by similar braces designated 20 and 21. The studs are further supported by a separating beam 22 whose extremities are mortised or cut out to receive the inner edges of the studs. A tie rod 23 is passed through the studs and longitudinally through the separating beam 22. In the construction of the mold the studs 6 and 17 are first placed in position, after which the members 5 and 16 are put in place being respectively mounted on the studs 6 and 17, as heretofore explained. After the mold is formed of the height required to justify the commencing of the wall, the concrete or other plastic material 24 is poured into the mold from the top. The mold is accordingly increased in height as required and a wall of any desired height may be formed in this manner. The mold may, if desired, be removed from the lower portion of the wall as soon as it becomes sufficiently hard for the purpose. Or, the mold may be left in place until the entire wall has hardened or set.

Having thus described my invention, what I claim is:

A mold of the character described, composed of two horizontally separated members, one of the said members being composed of sections arranged edgewise one above another, the said sections being of equal width and having recesses formed in their outer surfaces, the said recesses being oblong and vertically disposed, and provided with eyes horizontally anchored within the recesses, and studs vertically arranged edgewise for supporting the said sections, the studs being provided with adjustable and removable retaining bolts for the sections, one end of the said bolts having its end bent at an upward right-angle forming a hook adapted to be inserted in the oblong recess of the sections below the horizontally anchored eye and to be brought within engagement with the eyes as the sections are brought downwardly to rest upon the edge of the preceding sections, and the opposite end of said bolts being threaded and provided with a nut as a means of adjusting the same, substantially as described.

In testimony whereof I affix my signature in presence of two witnesses.

NILS F. ADAMSON.

Witnesses:
A. J. O'BRIEN,
THOMAS J. TULLY.